United States Patent
Trenel et al.

(10) Patent No.: US 6,368,027 B1
(45) Date of Patent: Apr. 9, 2002

(54) AIR CONVEYOR FITTED WITH A BOTTOM LONGITUDINAL GUIDE FOR TRANSPORTING SUSPENDED ARTICLES IN AN INCLINED POSITION

(75) Inventors: Joël Trenel, Marcq en Baroeul; Carlos Rodrigues, Lille, both of (FR)

(73) Assignee: Netra Systems, Marcq en Baroeul (FR)

( * ) Notice: Subject to any disclaimer, the term of this patent is extended or adjusted under 35 U.S.C. 154(b) by 0 days.

(21) Appl. No.: 09/529,075

(22) PCT Filed: Feb. 17, 2000

(86) PCT No.: PCT/FR00/00405

§ 371 Date: Apr. 6, 2000

§ 102(e) Date: Apr. 6, 2000

(87) PCT Pub. No.: WO01/60724

PCT Pub. Date: Aug. 23, 2001

(51) Int. Cl.[7] ............................................. B65G 47/24
(52) U.S. Cl. ............................. 406/87; 406/83; 406/88
(58) Field of Search ................................. 406/83, 87, 88, 406/86

(56) References Cited

U.S. PATENT DOCUMENTS

| | | | | |
|---|---|---|---|---|
| 4,284,370 A | * | 8/1981 | Danler et al. ................. | 406/86 |
| 5,100,265 A | * | 3/1992 | Mirkin ........................ | 406/86 |
| 5,161,919 A | * | 11/1992 | Smith et al. .................. | 406/86 |
| 5,246,314 A | * | 9/1993 | Smith et al. .................. | 406/86 |
| 5,421,678 A | * | 6/1995 | Aidlin et al. ................. | 406/88 |
| 5,484,237 A | * | 1/1996 | Langenbeck ................. | 406/86 |
| 5,516,239 A | * | 5/1996 | Warren et al. ................ | 406/88 |
| 5,542,789 A | * | 8/1996 | Aidlin et al. ................. | 406/88 |
| 5,810,516 A | * | 9/1998 | Ouellette ..................... | 406/86 |

FOREIGN PATENT DOCUMENTS

FR 2781470 * 1/2000 ........... B65G/51/03

* cited by examiner

Primary Examiner—Christopher P. Ellis
Assistant Examiner—Joe Dillon, Jr.
(74) Attorney, Agent, or Firm—Wolf, Greenfield & Sacks P.C.

(57) ABSTRACT

The air conveyor enables suspended articles to be transported, e.g. empty plastics bottles B, under drive from air jets. It has a bottom longitudinal guide (6) which extends along the path of the articles, which has two facing longitudinal guide walls (7b), and which is positioned or suitable for being positioned relative to the suspension points of the articles in such a manner that an article suspended from the conveyor comes into contact via its base with the inside faces of the two guide walls, and is held tilted relative to the vertical and rearwards relative to the transport direction by a minimum conveying angle.

22 Claims, 4 Drawing Sheets

AIR CONVEYOR FITTED WITH A BOTTOM LONGITUDINAL GUIDE FOR TRANSPORTING SUSPENDED ARTICLES IN AN INCLINED POSITION

The present invention relates to the field of pneumatically transporting suspended articles, and more particularly lightweight articles such as empty bottles or flasks made of plastics material, preforms, etc., for example.

To transport lightweight articles, and in particular plastics or similar bottles, it is known to use air conveyors that are fitted with blow means enabling a plurality of air jets to be created that are directed on the articles in their transport direction.

For articles that can be suspended, for example plastics bottles having a collar on the neck, it is more particularly the practice to use air conveyors which are fitted with a guide rail, more commonly referred to as the under-collar guide, along which the articles are guided and transported while being suspended from the collar or the like. That type of conveyor is described, for example, in U.S. Pat. No. 4,284,370 or indeed in U.S. Pat. No. 5,161,919. It implements a main air trunk, commonly referred to as a "plenum", extending along the path of the articles, and a blow channel communicating with the main air trunk via blow slots or the like. The main trunk is fed with air, e.g. by means of a plurality of blowers suitably distributed along its length; this air is delivered via the blow slots in the form of a plurality of air jets that serve to propel the articles along the blow channel. In U.S. Pat. No. 4,284,370, the blow channel is rectangular in section and the blow slots are disposed above the guide rail, thereby making it possible to propel the articles by blowing on them above their collars. In U.S. Pat. No. 5,161,919, the blow channel is in the form of an upside-down V-shape, and the blow slots are disposed beneath the guide rail, thereby enabling articles to be propelled by blowing on them beneath their collars.

While they are being transported, articles suspended from their collars, for example, can swing sideways relative to the longitudinal direction of the conveyor, particularly in curved portions (bends) of the conveyor. To limit this sideways displacement of the articles, it is presently commonplace to fit air conveyors with lateral guides disposed on either side of the path of the articles, with the spacing between the lateral guides determining the maximum angle through which the articles can swing sideways. While they are being transported, bottles also tend to oscillate longitudinally with alternating forward and backward motion relative to the vertical, and that can hamper conveyance, and can also give rise to a risk of articles becoming jammed, e.g. by becoming jammed in a forward or backward position. To mitigate the front/back oscillations of the articles, proposals have already been made in U.S. Pat. No. 5,421,678 to fit an air conveyor with at least one longitudinal brush which extends along the path of the articles and which serves to apply a braking force continuously on the articles that are being transported so that the articles are transported in a stable manner, being tilted rearwards from the vertical relative to the transport direction by some given angle, referred to below as the "conveying" angle. More particularly, in the embodiment shown in FIG. 4 of that publication, the conveyor is fitted with two top and bottom pairs of lateral guides referenced 42 and 44 to limit sideways motion of the articles, and it is fitted with a brush referenced 60 that is fixed to one of the two bottom lateral guides 44. A first drawback of that solution is that the conveying angle depends in particular on the speed of the conveyor and on the material from which the bottles are made; in addition, it is not possible to guarantee a minimum conveying angle. A second drawback is that, in use, it is observed that the bristles of the brush become worn, and above all that the bristles take up a preferred orientation because of their repeated contact with the articles, thereby causing the article conveying angle to change over time. In order to conserve the proper conveying angle, it is therefore necessary on a regular basis to adjust the distance between the bristles of the brushes and the bodies of the articles, and in the end to replace brushes that have worn out.

A main object of the present invention is to propose a novel solution that also serves to improve the conveyability of suspended articles transported in air conveyor, by mitigating the problems of front/back oscillation and of lateral motion of the suspended articles while they are being transported, but which does not present the above-mentioned drawbacks of the solution recommended in U.S. Pat. No. 5,421,678.

This object is achieved by the invention which provides an air conveyor for transporting suspended articles under the drive of air jets, the conveyor being characterized in that it comprises a bottom longitudinal guide that extends along the path of the articles, which guide comprises two facing longitudinal guide walls and is positioned or suitable for being positioned relative to the suspension points of the articles in such a manner that an article suspended on the conveyor comes into contact via its base with the inside faces of the two guide walls which hold it tilted relative to the vertical and in a rearward direction relative to the transport direction at a minimum conveying angle.

In the invention, the bottom longitudinal guide performs two functions: it limits sideways motion of the articles and it imposes a minimum conveying angle, thereby making it possible to prevent front/back oscillation of the articles while they are being transported.

In a preferred embodiment, the conveyor is provided with means for adjusting the distance between the bottom longitudinal guide and the article support point in a vertical direction. This provides a modular air conveyor which can be adapted simply and quickly to the format of articles that are to be transported (i.e. their shape and size).

In a particular embodiment of the invention, the means for forming the transport air jets for propelling the articles along the conveyor are designed in such a manner as to generate at least lower air jets which are directed against the articles beneath their suspension points. Prior to the invention, implementing bottom transport air jets acting on a portion of the articles situated beneath the suspension point thereof, constituted a major source of instability for the transported articles, in particular when the transported articles were suspended from a carrier zone situated well above their centers of gravity, as is the case, for example, of plastic bottles that are transported by being suspended from projections on their necks. In that type of conveyor, it was therefore necessary in the past for the purpose of limiting the risk of article instability, and even though it could not be eliminated, to restrict the power of the bottom transport air jet and/or to position said bottom transport jets as close as possible to the article suspension point, with this being to the detriment of conveyor speed. Implementing a bottom longitudinal guide of the invention advantageously makes it possible to mitigate that drawback since the guide makes it possible to transport articles in a rearwardly-sloping position, thus avoiding any forward tilting of the articles under drive from the bottom transport air jets. This makes it possible to increase the power of the bottom transport air jets and/or to apply said bottom transport air jets to any of the portions of the articles situated beneath their suspension points, without interfering with the stability of the articles while being conveyed.

Other characteristics and advantages of the invention will appear more clearly on reading the following description of three variant embodiments of an air conveyor of the invention, which description is given by way of non-limiting example and with reference to the accompanying drawings, in which:

FIG. 1 shows a first embodiment of an air conveyor used for transporting empty plastics bottles B under drive from jets of air. In conventional manner, this air conveyor has a main blow trunk 1 which is designed to be fed with air under pressure by means of blowers (not shown) that are regularly distributed along the trunk 1.

Figure 1:
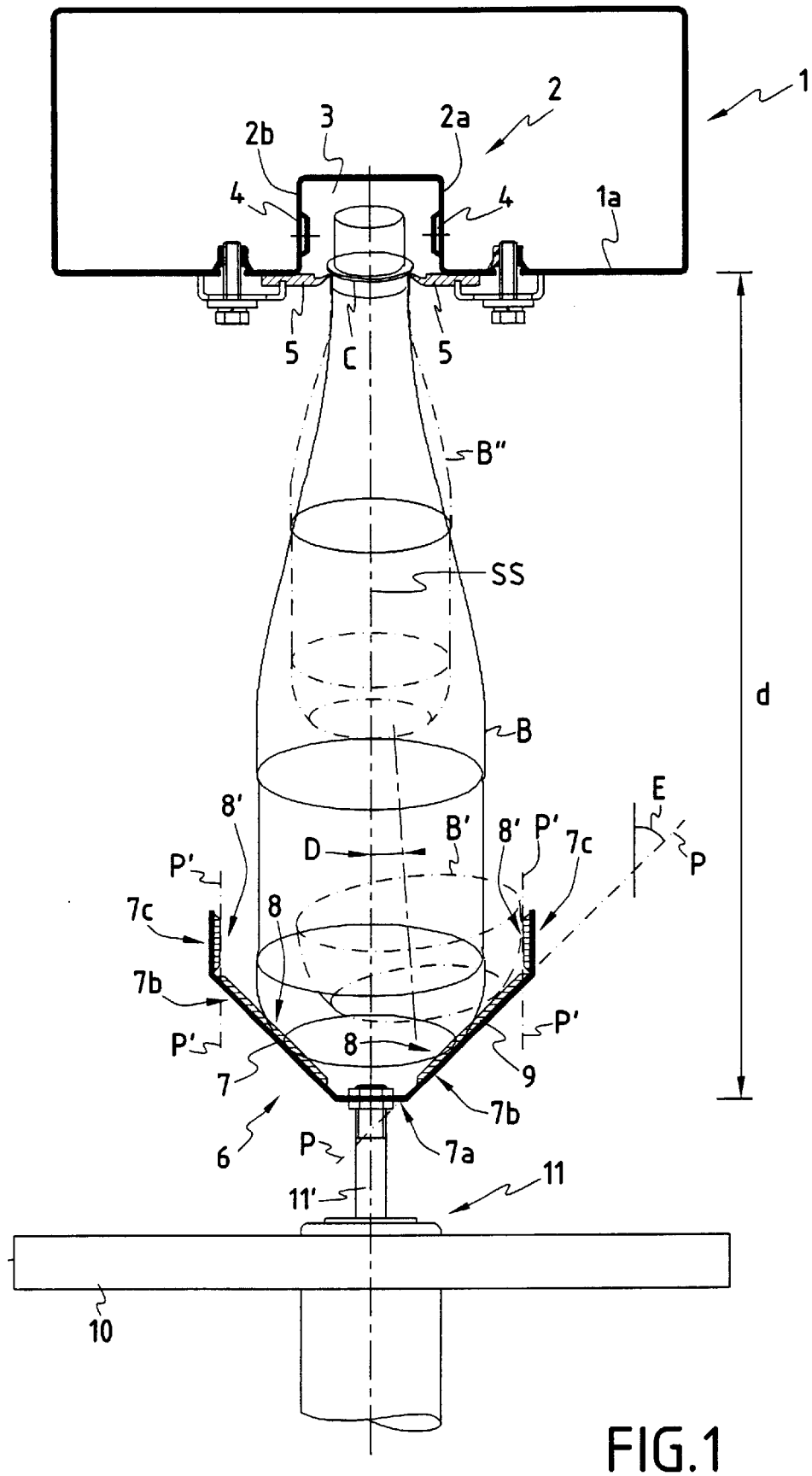
FIG. 1 is a diagrammatic section view of a first embodiment of an air conveyor with a multi-position V-shaped bottom longitudinal guide.

The bottom wall 1a of the blow trunk 1 forms a setback central portion 2 which defines a blow channel 3. In the side walls 2a and 2b of the setback 2, there are provided blow slots 4 which allow the air under pressure to escape from the inside of the trunk 1 into the blow channel 3 in the form of a plurality of air jets directed towards the bottles above their suspension points. The blow slots 4 are, for example, regularly distributed along the entire length of the blow channel 3. To support the bottles, the air conveyor is fitted with two under-collar guides 5 which are fixed to the bottom wall 1a of the blow trunk 1, and which define a support and guide rail for the bottles B all along the conveyor.

In the particular example shown in FIG. 1, there is shown a bottle B suspended on the two guide rails 5 by means of its collar C. The invention is not restricted to this implementation. In variants, the bottle support zone need not necessarily be constituted by collars on the bottles, but could be constituted, for example, by any projection or other equivalent means on any portion of the body of a bottle.

Figure 2:
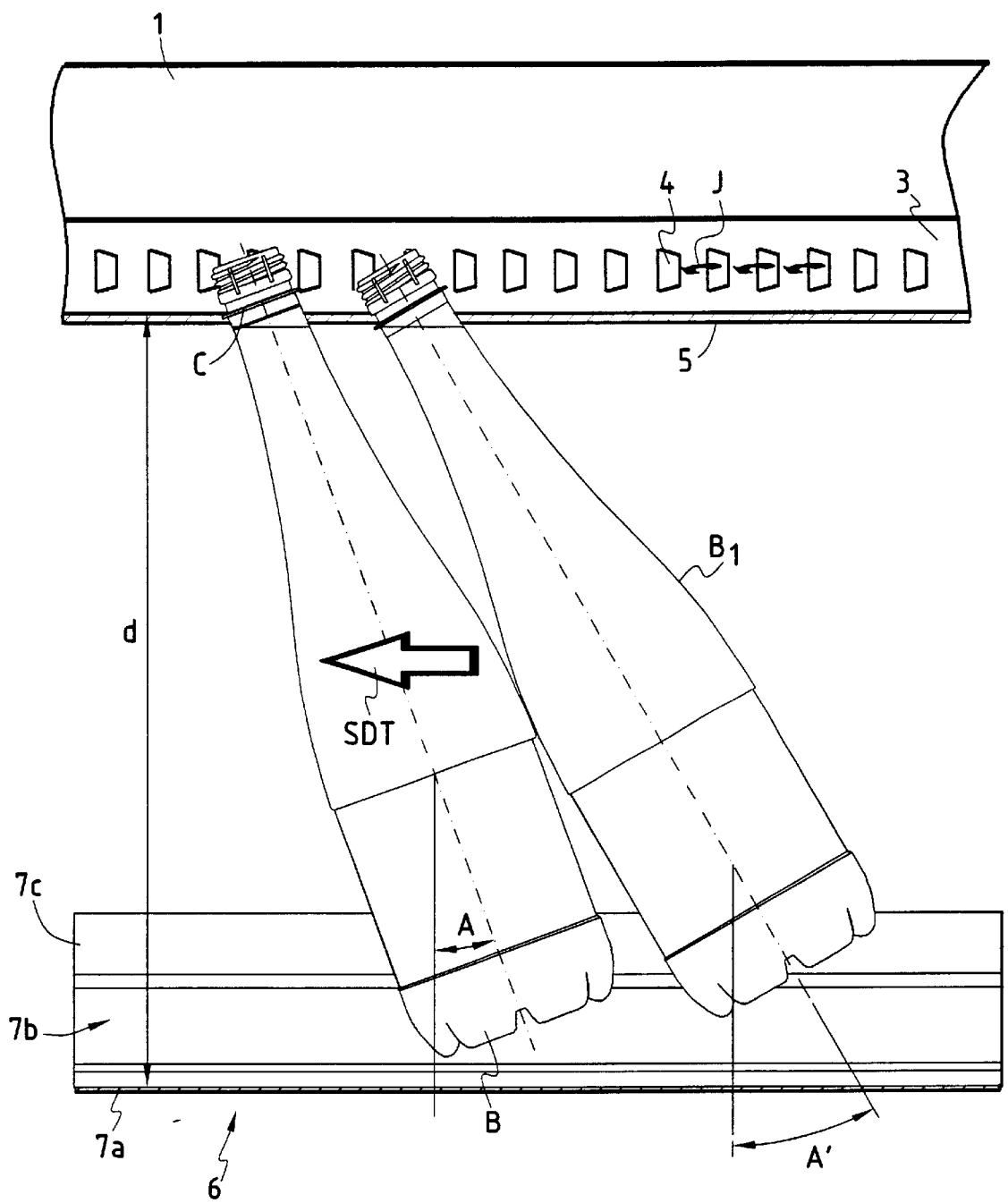
FIG. 2 is a diagrammatic side view of the FIG. 1 conveyor.

When the blow trunk 1 is fed with air under pressure, this pressurized air escapes through the slots 4 in the form of a plurality of air jets J (FIG. 2) which are generated above the collars of the bottles B, and which serve to propel the bottles along the two guide rails 5 in a given transport direction represented by arrow SDT in FIG. 2.

In accordance with an essential and novel characteristic of the invention, the air conveyor of FIGS. 1 and 2 is fitted with a bottom longitudinal guide 6 which extends along the bottle path, and which, in the example shown, has a section that is substantially V-shaped. In the particular example shown, this bottom longitudinal guide 6 is formed by a folded piece of sheet metal 7 having a bottom 7a which is extended symmetrically on either side by two sloping longitudinal walls 7b that face each other and that are referred to below as guide walls, each of these two guide walls 7b being extended at its top by a top rim 7c.

The bottom longitudinal guide 6 is mounted on the conveyor vertically below the two guide rails 5 in such a manner that the axis of symmetry of the bottom guide coincides with the axis of symmetry SS of the conveyor, i.e. essentially the axis of symmetry between the two guide rails 5. This bottom guide 6 also extends over all or part of the length of the conveyor.

In the embodiment of FIG. 1, the bottom longitudinal guide 6 forms a plane PP that slopes relative to the vertical at an angle E on the inside face 8 of each of its longitudinal guide walls 7b. The two planes PP formed by the guide walls 7b converge downwards. The guide 6 also forms a plate P'P' that is substantially vertical at the top rim 7c of each of its inside faces 8'. In a variant (not shown) the inside face 8 of each guide wall 7b and the inside face 8' of each rim 7c could be constituted directly by the wall of the guide, in which case it is preferable for the guide to be made out of a material having a low coefficient of friction, for example a guide made of stainless steel or of a plastics material of the high density polyethylene (HDPE) type. In the variant shown in FIG. 1, the inside faces 8 and 8' of the guide walls 7b and of the rims 7c are provided with a coating 9 that has a very low coefficient of friction. By way of example, the coating can be made of polytetrafluoroethylene (PTFE).

FIGS. 1 and 2 show a bottle B which is suspended from the two guide rails 5 by means of its collar C. In this position, under the action of its own weight, the bottle comes into contact with the inside face 8 of the two guide walls 7b of the guide 6.

More precisely, with reference to FIG. 2, the distance d between the suspension point of the bottle B (i.e. the under-collar guides 5) and the guide 6 is adjusted in such a manner that when the bottle B is suspended from the under-collar guide 5, its own weight brings it into contact with the inside faces of the two guide walls 7b of the guide 6 with the bottle being inclined at some minimum conveying angle A.

While the bottle is being transported under drive from the transport air jet J coming from the blow slot 4, it is propelled in the direction SDT (FIG. 2). Because of the presence of the two guide walls 7b of the guide 6, the bottle B is transported in stable manner, sloping backwards by a minimum angle A, thereby avoiding any risk of the bottle oscillating forwards, which could be harmful to the stability of the conveyor. Also and advantageously, the lack of any front/back swinging of the bottles while they are being transported makes it possible to avoid problems whereby the necks of the bottles become marked under the collar on contact with the under-collar guides. Likewise, by transporting the bottle B in a position where it slopes rearwards, the contact zones between the collar C and the under-collar guide 5 are restricted, thereby restricting friction and making the bottles more conveyable. Phenomena associated with wear of the under-collar guides are also limited, which phenomena are mainly observed when the under-collar guides are made of plastics material. Naturally, during transport, a bottle is not necessarily continuously in contact with both guide walls 7b of the guide 6, and its angle of tilt in a rearward direction from the vertical C can be increased, as happens, for example, when a bottle comes into contact with a preceding bottle and rolls against the back thereof, as shown in FIG. 2 for bottle B1 which is shown tilted rearwards from the vertical by a rolling angle A' which is greater than the conveying angle A.

During normal transport of bottles B, the two guide walls 7b make it possible simultaneously to impose a minimum conveying angle of tilt towards the rear on the transported bottles and also to provide lateral guidance for the bottles, preventing the bottle B from swinging through too great an angle in a vertical plane extending substantially transversely to the transport direction (i.e. in the plane of FIG. 1).

The risk of bottles swinging during transport is greater in the curved portions of the conveyor (bends). In such curved portions, bottles have a tendency under centrifugal force to lift off the inside faces of the two guide walls 7b, rising rearwards and moving laterally outwards. The use of raised rims 7c that are substantially vertical serves to prevent the bottles escaping from the guide 6, particularly in curved portions. For a better understanding of the function of the rims 7c of the guide 6, FIG. 1 shows in dashed lines the bottom of a bottle B' in its position of greatest outward swing in a curve (angle D). In this position, the bottom of the bottle comes into contact both with the top portion of the guide wall 7b and with the inside face of one of the two rims 7c, thereby making it possible to keep the bottle B, inside the guide 6.

In a simpler embodiment of the guide 6, it would nevertheless be possible for the guide 6 to be designed without the two vertical rims 7c. Such a guide of simpler structure could be used, for example, in the straight portions of a conveyor or in curved portions of large radius of curvature in which the lateral swing angles of the bottles are relatively small.

In the particular embodiment of FIG. 1, the inside faces of the two guide walls 7b form respective sloping planes PP that are slope at an angle E of about 45°. Although this characteristic is preferred, the invention is not limited thereto. In another embodiment, this angle could be greater or smaller. In addition, it is not essential for the inside faces of the two guide walls 7b to form planes, it being possible in other variants for said faces to be curved in any way, in particular they could be convex or concave.

In accordance with a preferred but non-limiting characteristic of the invention, the bottom longitudinal guide 6 is adjustable in position in a vertical plane, thus making it possible to adjust the distance d between the guide 6 and the under-collar guides 5. In the embodiment of FIG. 1, the height of the guide 6 is adjusted by means of a plurality of actuators 11 which are mounted on a frame 10 that is fixed relative to the ground, and that are suitably distributed along the length of the guide 6. The guide 6 is fixed by any suitable means to the rod 11' of each actuator 11. In the example shown, the rods 11' of the actuators 11 are fixed to the bottom 7a of the guide 6. By moving the rods 11' of the actuators 11, it is possible to adjust the height of the guide 6 relative to the under-collar guides 5, i.e. in the embodiment of FIG. 1, relative to the point from which the bottles are suspended by means of their collars C. Advantageously, this characteristic makes it possible to provide a multi-format air conveyor, i.e. a conveyor that is easily adapted to transporting bottles in a variety of shapes and sizes. It is thus possible, by reducing the distance d, to transport in reliable manner bottles that are smaller in size than the bottle B shown in FIG. 1, e.g. bottles such as the bottle B" shown in dashed lines in FIG. 1. Similarly, it will be understood that by adjusting the distance d between the guide 6 and the top suspension point of the bottles, two adjustments are performed simultaneously and in simple manner by means of the guide walls 7b: the minimum conveying angle A of the bottles is adjusted; and the lateral guidance of the bottles is adjusted as a function of the shape and the size of the bottles.

It is up to the person skilled in the art to adjust the distance d between the bottom longitudinal guide 6 and the suspension point of the bottles on a case by case basis so as to obtain a minimum conveying angle A suitable for obtaining better conveyability of the bottles. In practice, after performing tests with various bottle formats, it has been found that for most bottles that exist on the market, bottles are transported under optimum conditions by adjusting the minimum conveying angle A to lie in the range 2° to 20°, and preferably in the range 5° to 10°, with the choice of angle within said range of values being made for any given type of bottle on a case by case basis and in empirical manner by the person skilled in the art. These values for minimum conveying angle A are nevertheless given in purely indicative manner, and the invention is not limited thereto, it being possible to implement the invention with minimum conveying angles A lying outside the above-specified ranges of values.

Figure 3:
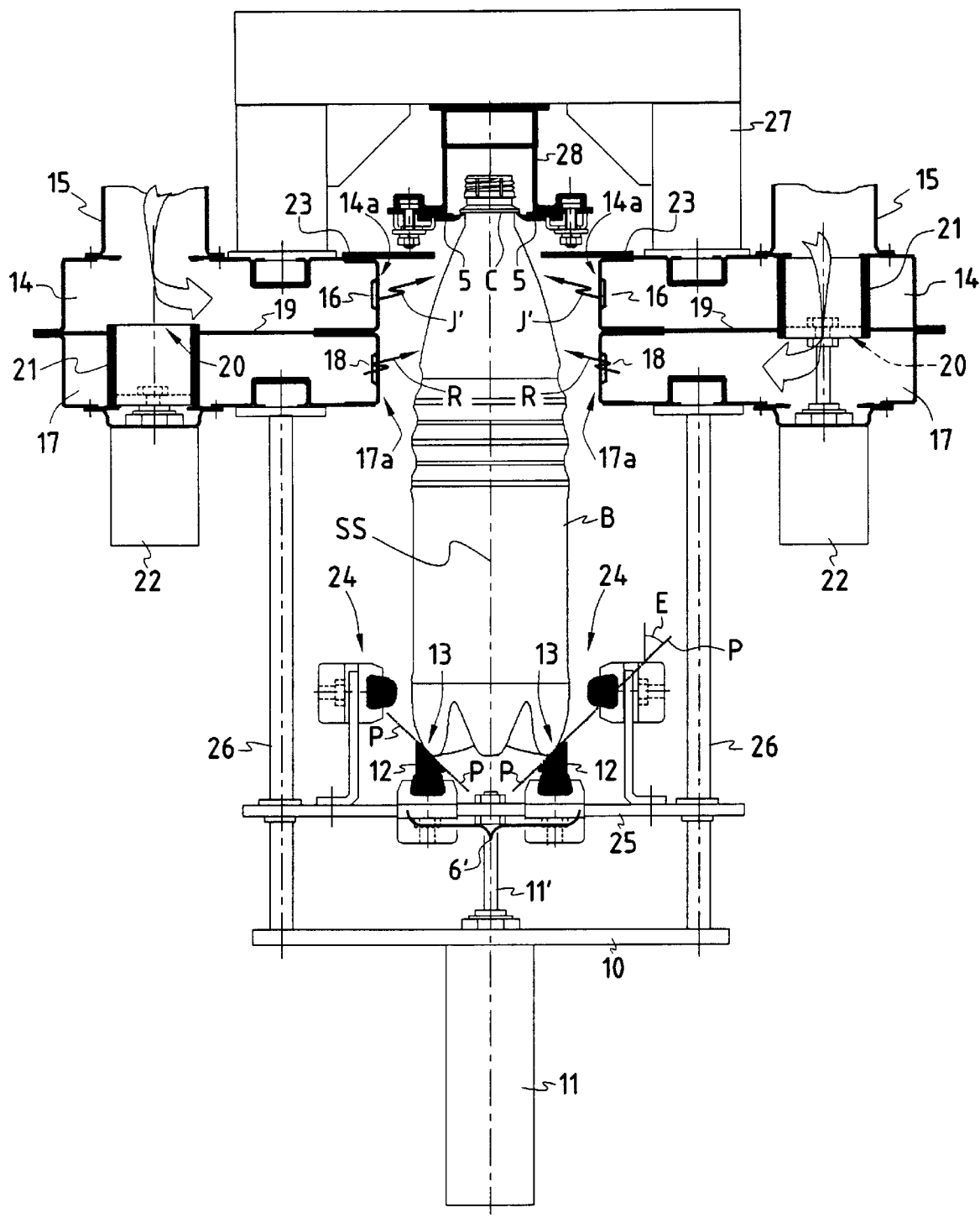
FIG. 3 is a section view of a second embodiment of an air conveyor of the invention.

FIG. 3 shows another variant of the air conveyor in which the bottom longitudinal guide 6' is implemented in the form of two identical longitudinal bars 12 mounted parallel to each other, and each having a longitudinal plane portion 13. These two bars 12 are mounted in such a manner that the plane portions 13 face each other and each of them forms a plane PP that slopes relative to the vertical at an angle E. These two plane portions 13 correspond to and perform the same function as the inside faces 8 of the two guide walls 7b of the guide 6 in FIG. 1. The two bars 12 are preferably made of a material having a low coefficient of friction, for example a plastics material of the polyethylene (PE) type.

In the variant of FIG. 3, and unlike that of FIG. 1, the transport of the bottles along the conveyor under drive from jets of air is not achieved by means of top transport air jets generated above the support points of the bottles (under-collar guide 5), but is achieved solely by lateral blowing by means of transport air jets J' which are directed onto the bottles beneath their support points. More particularly, in the embodiment shown in FIG. 3, the under-collar guides 5 are fixed rigidly to a rail 28 forming a cover that is closed with the exception of its bottom face which is open, said cover serving to protect the necks of the bottles above their collars. To form the transport air jets J', the conveyor has two blow trunks 14 which are disposed on either side of the path of the bottles B. Each trunk is designed to be fed with air under pressure via an automatic feed duct 15. Each blow trunk 14 also has a longitudinal face 14a which faces towards the bottles and in which there are formed blow openings or slots 16 similar to the blow openings or slots 4 of the FIG. 1 conveyor.

The FIG. 3 air conveyor also has two additional blow trunks 17 designed to generate reverse bottom air jets R towards the bottles, i.e. jets of air that are aimed at the bottles below their suspension points, and that extend in a direction that is opposite to the transport direction SDT of the bottles. For this purpose, each blow trunk 17 also has a plurality of blow slots 18 in its face 17a that faces towards the bottles.

In the particular embodiment shown in FIG. 3, a blow trunk 14 and a blow trunk 17 are made by means of a common box which is subdivided into two compartments, a top compartment and a bottom compartment, by a partition sheet 19, with the top compartment forming the blow trunk 14 for forming the transport jets J' and the bottom compartment forming the blow trunk 17 for forming the reverse air jet R. In another variant, the positions of the blow trunks 14 and 17 could be inverted. Likewise, the blow trunks 14 and 17 could be constituted by two separate boxes, being fed with air under pressure independently or otherwise. In the variant of FIG. 3, the supply of air under pressure to the blow trunk 17 takes place via the trunk 14 and an admission opening 20 provided in the partition wall 19. An air control slide member 21 is provided in the admission opening 20 and is suitable for being actuated between a high position and a low position by an actuator 22. In its high position (position of the slide member 21 on the right of FIG. 3), the slide member 21 connects the air admission duct 15 to the opening 20, isolating the inside of the blow trunk 14 from the admission duct 15 and connecting the inside of the blow trunk 17 directly to the admission duct 15, thereby enabling reverse air jets R to be applied to the bottles. Conversely, when in its low position, as represented by the position of the slide member 21 on the left of FIG. 3, the inside of the blow trunk 17 is isolated from the admission duct 15 and air is admitted to the blow duct 14, thereby directly applying transport air jets J' onto the bottles.

In operation, the left and right slide members 21 are either in the high position (to generate reverse air jets R on the bottles, e.g. to unjam them, or to slow them down, or possibly even to stop them by air braking in a given segment of the conveyor), or else in the low position (to generate transport air jets J' on the bottles) so as to propel the bottles in the normal transport direction SDT. It is also possible with the conveyor of FIG. 3 to reverse the normal transport direction of the bottles in the conveyor, with the functions of the air jets coming from the blow trunks 14 and 17 then being inverted. The conveyor is thus entirely reversible as concerns normal transport of bottles, and this can be done easily and quickly without requiring the conveyor to be modified structurally.

In the variant of FIG. 3, the blow trunks 14 and 17 are fed from a common source of air under pressure. In another variant, these blow trunks could be fed independently from different sources of air. Likewise, it is possible in another embodiment, to feed the blow trunks 14 and the two blow trunks 17 from a common source of air under pressure, but with air being distributed not by means of the slide members 21, but by feeding each of the blow trunks 14 and 17 via secondary couplings that are connected to the common air source, with each secondary coupling being fitted with a damper register or with any other equivalent means suitable for controlling air feed to the corresponding trunk.

One of the advantages of the conveyor of FIG. 3 compared with the conveyor of FIG. 1 lies in the fact that the air jets (transport J' or reverse R) are directed on the bottles in zones that are situated beneath their suspension points, thereby reducing the risk of air coming directly into contact with the open necks of the bottles and/or penetrating into the bottles B and contaminating them. Conversely, with the conveyor of FIG. 1, in order to avoid any risk of contaminating the insides of the bottles transported by the transport air jets J, it is essential to filter the air which is introduced under pressure into the blow trunk 1, and to do so with the appropriate degree of precaution which requires high performance filters to be used, and they are expensive. In the configuration shown in FIG. 3, given that the air jets are not generated above these collars, the risks of contamination are reduced. In addition, in order to reduce these risks even further, the air conveyor is fitted with two deflection walls 23 disposed on either side of the bottle path, and serving to prevent air coming from the blow trunks 14 and 17 rising up to the open necks of the bottles B.

In the variant of FIG. 3, the guide 6' does not have portions performing the above-described function of the raised rims 7c of the guide 6 in FIG. 1. Nevertheless, the conveyor of FIG. 3 has two lateral guides 24 which are positioned close to the guide 6' and which serve in particular in curved portions of the conveyor to limit the lateral angle of swing of the bottles and to prevent the bottles escaping accidentally from the guide 6'.

It should be emphasized that before the invention it was already known to transport suspended bottles under drive from air jets applied beneath the suspension point of the bottles, thereby obtaining the above-described advantage, i.e. a reduction in the risk of the air coming into contact with the open necks of the bottles and/or being capable of penetrating into the bottles B and contaminating them.

Nevertheless, until now, such low blowing has always been performed to the detriment of the bottles being conveyed properly, since the bottles tend under drive from the transport air jets to oscillate forwards through an angle that is larger than when blowing is performed solely above the collars, as in the conveyor of FIG. 1. By implementing the bottom longitudinal guide of the invention, that drawback is eliminated. The low blowing (air jets J' in FIG. 3) makes it possible to apply an air thrust force on the bottles between two support points (a top portion against the under-collar guides 5 and a bottom point against the longitudinal guide 6'), thereby conveying the bottles in entirely stable manner. Bottle stability during transport is achieved regardless of the air power applied and regardless of the point at which the air thrust force is applied, i.e. in other words, regardless of the power and the position of the transport air jets relative to the bodies of the bottles.

More particularly, in the embodiment of FIG. 3, and in a manner similar to the example of FIG. 1, the relative position of the bottom longitudinal guide 6' formed by the two bars 12, and also the relative position of the two lateral guides 24, are adjustable vertically relative to the under-collar guides 5. This vertical adjustment is obtained by mounting the guide 6' and the lateral guides 24 on a slide 25 that is movable vertically between two columns 26 under drive from actuators 11 whose rods 11' are rigidly connected by any appropriate means to the slide 25. The actuators 11, the frame 10, the columns 26, the blow trunks 14 and 17, the bridges 27, and the rail 28 supporting the under-collar guides 5 form an assembly that is fixed relative to the ground.

Figure 4:
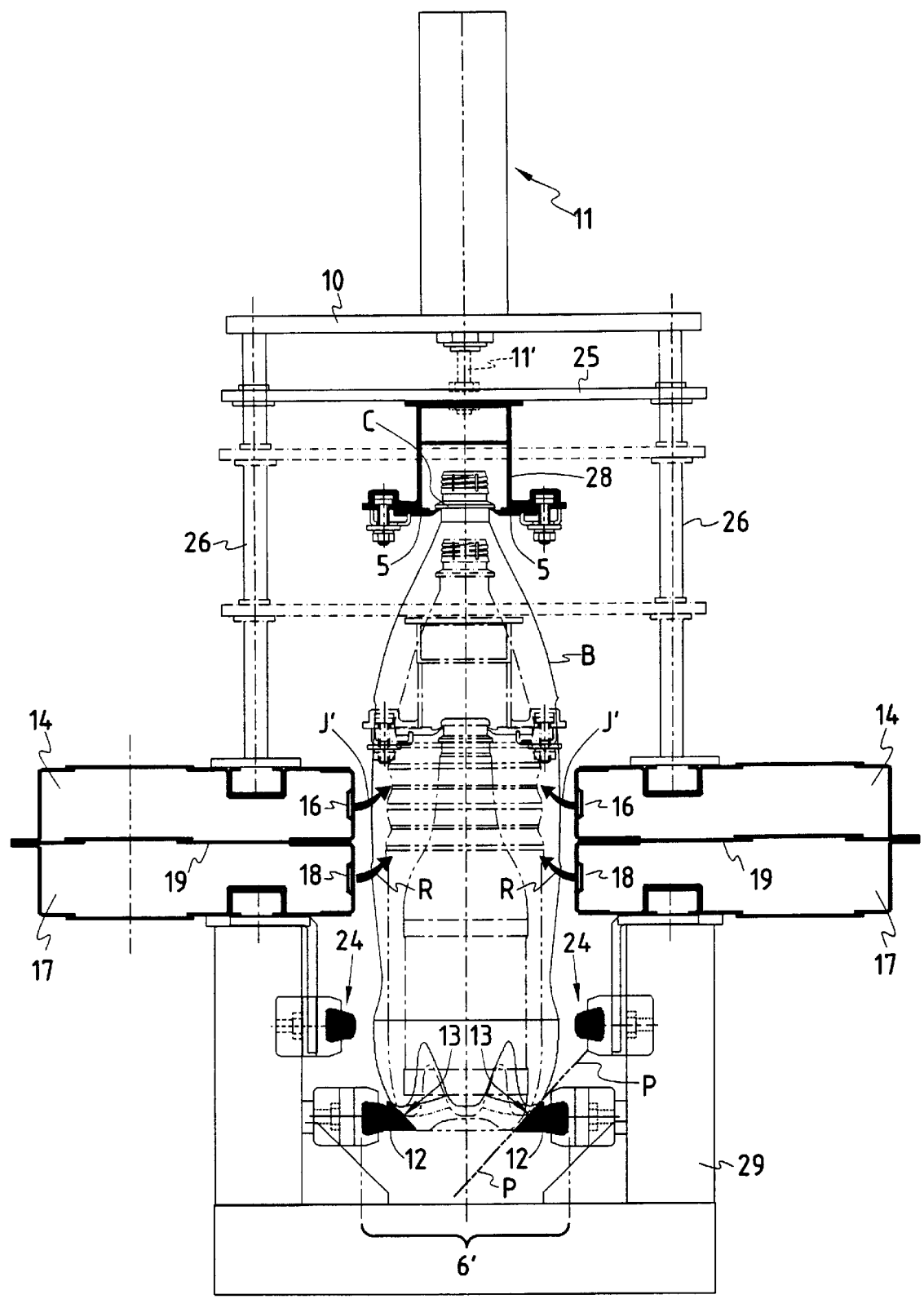
FIG. 4 is a diagrammatic section view of a third embodiment of an air conveyor of the invention.

FIG. 4 shows another variant embodiment which is quite close to that of FIG. 3, but which differs therefrom essentially by the fact that the bottom longitudinal guide 6' constituted by the two bars 12 and the two lateral guides 24 is fixed in position relative to the ground and the distance between the two under-collar guides 5 and said guide 6' together with the lateral guides 24 is adjusted by modifying the position of the under-collar guides 5 relative to the ground. For this purpose, the rail 28 supporting the under-collar guides 5 is movable vertically by being mounted on a plurality of slides 25 which are suitably distributed along the conveyor and which are vertically movable between respective pairs of columns 26. Each slide 25 can be moved vertically by means of an actuator 11 whose rod 11' is rigidly connected by any appropriate means to the slide 25. The actuators 11, the frame 10, the columns 26, the air trunks 14 and 17, the bridges 29, the bottom guide 6', and the lateral guides 24 form a rigid assembly which is fixed relative to the ground.

The vertical position of the bottom longitudinal guide 6' and the lateral guides 24 in the variant of FIG. 3 or of the under-collar guides 5 in the variant of FIG. 4 can be controlled equally well manually or automatically in the invention.

What is claimed is:

1. An air conveyor which transports suspended articles in a path in a transport direction under the drive of air jets, the conveyor comprising a bottom longitudinal guide that extends along the path of the articles, the guide being structured and positioned relative to suspension points of the articles in such a manner that an article suspended on the conveyor comes into contact with said guide which holds the article tilted relative to a verticle direction and in a rearward direction relative to the transport direction at a minimum conveying angle substantially along the entire path.

2. The conveyor according to claim 1, wherein the position of the bottom longitudinal guide relative to the suspension points of the articles is such that the minimum conveying angle of the articles lies in the range of about 2° to 20°.

3. The conveyor according to claim 2, wherein the range is about 5° to 10°.

4. The conveyor according to claim 1, further comprising means for adjusting a distance separating the bottom longitudinal guide from the suspension points of the articles in the vertical direction.

5. The conveyor according to claim 4, wherein the adjustment means comprise a plurality of actuators distributed along the conveyor.

6. The conveyor according to claim 1, wherein means for forming the air jets for propelling the articles along the conveyor are structured to generate at least lower air jets directed against the articles beneath the suspension points of the articles.

7. The conveyor according to claim 6, further comprising at least two blow trunks that extend on either side of the path of the articles to form the lower air jets, the trunks being structured to be fed with air under pressure, each trunk having a face facing towards the articles and having blow openings to allow air under pressure to escape from inside the trunk in the form of lower transport air jets.

8. The conveyor according to claim 1, wherein each guide wall of the bottom longitudinal guide has a planar inside face which forms a plane that slopes relative to the vertical direction, the planes formed by the two guide walls converging downwardly away from the article.

9. The conveyor according to claim 8, wherein the inclined planes formed by the inside faces of the two guide walls of the longitudinal guide slope at a same angle relative to the vertical direction.

10. The conveyor according to claim 9, wherein the angle of the inclined planes relative to the vertical direction is substantially 45°.

11. The conveyor according to claim 1, further comprising two lateral guides for limiting lateral swinging of the articles.

12. The conveyor according to claim 11, wherein the two lateral guides are formed by two top rims of the longitudinal guide.

13. The conveyor according to claim 12, wherein an inside face of each top rim of the guide forms a plane that is substantially vertical.

14. The conveyor according to claim 1, wherein means for forming air jets for propelling the articles along the conveyor are structured to generate only lower air directed against the articles beneath the suspension points.

15. The conveyor according to claim 14, comprising at least two blow trunks extending on either side of the path of the articles to form the lower air jets, and being fed with air under pressure, each trunk having a face facing towards the articles and having blow openings to allow air under pressure to escape from inside the trunk in the form of lower air jets.

16. The conveyor according to claim 15, comprising means enabling reverse air jets to be generated extending in a direction opposite the transport direction of the articles, the reverse air jets being directed onto the articles beneath the suspension points of the articles, the means for enabling reverse air jets comprising two blow trunks extending on either side of the path of the articles, and being fed with air under pressure, each blow trunk having a face facing towards the articles, and having blow openings to allow air under pressure to escape from inside the trunk in the form of reverse air jets, the blow trunk for forming air jets and the blow trunk for forming reverse air jets being formed by two respective superposed compartments of a blow box.

17. The conveyor according to claim 16, wherein air is distributed between the two blow trunks of a box by means of slide members driven by actuators.

18. The conveyor according to claim 1, further comprising means enabling reverse air jets to be generated extending in a direction opposite to the transport direction of the articles.

19. The conveyor according to claim 18, wherein the reverse air jets are directed onto the articles beneath the suspension points of the articles.

20. The conveyor according to claim 19, wherein the means for enabling reverse air jets comprise two blow trunks extending on either side of the path of the articles and being structured to be fed with air under pressure, each trunk having a face facing towards the articles, and having blow openings to allow air under pressure to escape from inside of the trunk in the form of reverse air jets.

21. The conveyor according to claim 20, further comprising means for forming air jets for propelling the articles along the conveyor that are structured to generate at least lower air jets directed against the articles beneath the suspension points of the articles, said forming means comprising at least two blow trunks extending on either side of the path of the articles to form the lower air jets, and being structured to be fed with air under pressure, each blow trunk having a face facing towards the articles and having blow openings to allow air under pressure to escape from inside the trunk in the form of lower air jets, wherein the blow trunk for forming lower air jets and the blow trunk for forming reverse air jets are formed by two respective superposed compartments of a blow box.

22. The conveyor according to claim 21, wherein air is distributed between the two blow trunks of a box by slide members driven by actuators.

* * * * *